United States Patent [19]

Batchelder et al.

[11] Patent Number: 5,072,967
[45] Date of Patent: Dec. 17, 1991

[54] INSTRUMENT PANEL WITH INVISIBLE AIRBAG DEPLOYMENT DOOR

[75] Inventors: Bruce Batchelder, Barrington; Scott Rafferty, Dover, both of N.H.

[73] Assignee: Davidson Textron Inc., Dover, N.H.

[21] Appl. No.: 551,318

[22] Filed: Jul. 12, 1990

[51] Int. Cl.⁵ .................. B60R 21/045; B60R 21/22
[52] U.S. Cl. ..................................... 280/732; 280/752
[58] Field of Search ............... 280/732, 743, 730, 728, 280/740, 752

[56] References Cited

U.S. PATENT DOCUMENTS

| 3,756,617 | 9/1973 | Brown | 280/732 |
| 3,799,573 | 3/1974 | McDonald | 280/740 |
| 4,911,471 | 3/1990 | Hirabayashi | 280/732 |

FOREIGN PATENT DOCUMENTS

| 3116538 | 11/1982 | Fed. Rep. of Germany | 280/732 |
| 3904977 | 1/1990 | Fed. Rep. of Germany | 280/743 |
| 1-122754 | 5/1989 | Japan | 280/743 |

Primary Examiner—Kenneth R. Rice
Assistant Examiner—Karin Tyson
Attorney, Agent, or Firm—John C. Evans

[57] ABSTRACT

A cover assembly for an airbag restraint has a smooth cover and a load bearing insert for concealing an airbag restraint system having a housing, an airbag and a gas generator which includes an inflatant for inflating the airbag for deploying the airbag through the smooth outer cover member. The outer cover member has weakened sections on the inboard surface and filler material is disposed against the cover member to prevent inward collapse of the outer cover member at the weakened sections. An insert is formed in situ of the filler material in an opening in a restraint member and the insert is engaged during initial inflation of the airbag to displace the filler material so as to stress the outer cover member at the weakened sections thereof for separating a hidden door segment from the cover member as the airbag is inflated and solely in response to such inflation prior to deployment of the airbag into the passenger compartment.

8 Claims, 2 Drawing Sheets

INSTRUMENT PANEL WITH INVISIBLE AIRBAG DEPLOYMENT DOOR

FIELD OF THE INVENTION

This invention relates to airbag restraint systems for vehicles and more particularly to such airbag restraint systems which are covered by a cover assembly for concealing the airbag restraint system in a vehicle passenger compartment.

BACKGROUND OF THE INVENTION

Various airbag restraint systems are known in which a cover assembly covers the airbag restraint components prior to deployment of an airbag into the vehicle passenger compartment.

U.S. Pat. No. 3,622,176 discloses a cover with a perforated outer skin. The problem with such an arrangement is that the weakened sections tend to collapse inwardly and are visible and thus do not fully conceal the underlying airbag restraint system. Furthermore, such systems depend upon the force of the inflating airbag to tear the cover to form a deployment opening therein Such tearing can at times hinder deployment in an undesirable manner.

U.S. Pat. No. 4,097,064 discloses a cover assembly which carries a cutter to pierce the outer skin of the cover assembly. However, the '064 arrangement requires a separate inertially responsive shield for protecting the airbag during its deployment.

U.S. Pat. No. 4,246,213 discloses a cover assembly that includes a cover having weakened sections in the outer shell or skin of a cover assembly. The '213 arrangement depends upon tearing of the outer skin at the weakened sections for airbag deployment and presents the same disadvantages as in the case of the '176 patent.

SUMMARY OF THE INVENTION

A feature of the present invention is to provide a cover assembly having an invisible deployment door therein separable from the cover assembly solely in response to airbag inflation for forming an opening therethrough for deployment of an airbag into a vehicle passenger compartment.

A further feature of the present invention is to provide a cover assembly for an airbag restraint system in which a hidden door is formed in an outer shell forming a continuous uninterrupted covering over an interior trim part in a vehicle by forming weakened sections on the inboard surface of the outer shell and filling the weakened section with filler material having an insert member formed in situ thereof which is engageable with an airbag upon initial inflation of the airbag to force the insert against the filler material to stress the weakened sections for causing the hidden door segment to be separated from the cover assembly to form a passage therethrough for deployment of the airbag into a vehicle passenger compartment.

Yet another feature of the present invention is to provide a cover assembly as set forth above wherein the filler material is a foam material bonded to both the outer shell and the insert.

Still another feature of the present invention is to provide a cover assembly as set forth in the preceding features wherein the insert is tethered to a restraint member such that the hidden door segment and filler material will be retained together upon separation from the cover assembly.

An object of the invention is to hide a airbag restraint system behind an invisible door in an interior trim member; a retaining member supports the interior trim member on a vehicle frame; the interior trim member has an outer shell with a smooth outer surface and with grooves formed on the inner surface of the outer shell to define the perimeter of a hidden door segment for separation from the outer shell to form an opening for deployment of the airbag through the outer shell; and wherein filler material fills the grooves to prevent the smooth outer surface from collapsing inwardly of the outer shell; and wherein an insert is located within the interior trim member engageable with the airbag upon initial inflation thereof to cause the insert to be directed against the filler material to cause the outer shell to be stressed at the grooves to cause the hidden door segment to be separated from the outer shell for passage of the filler material and the insert outwardly of said the trim member panel so as to define the opening therein for deployment of the airbag.

A further object is to provide for such hiding by use of a cover assembly as set forth in the preceding object including a tether for the insert, filler material and hidden door following deployment of the airbag.

A still further object is to provide for such concealment by use of a cover assembly as set forth in the preceding object wherein the filler material is a layer of foam material for resiliently supporting the outer cover against collapse at the grooves therein and the insert being formed in situ of the foam material and bonded thereto.

Yet another object of the present invention is to provide for such concealment by use of a cover assembly as set forth above wherein the outer cover is formed as the full outer skin of an instrument panel and having the grooves therein formed so as to direct the separated segment against a vehicle windshield located above the instrument panel for absorbing the impact thereof as the airbag is deployed into the passenger compartment.

These and other objects, advantages and features of the present invention will be more apparent when taken in conjunction with the following detailed description of the invention along with reference to the accompanying drawings wherein:

DETAILED DESCRIPTION OF THE PREFERRED EMBODIMENT

Figure 1:
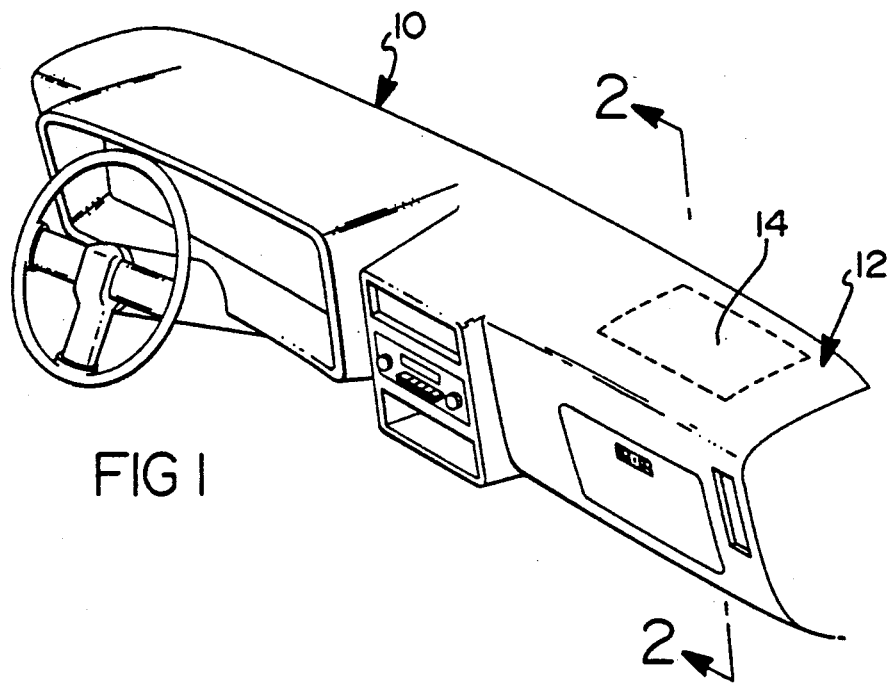
FIG. 1 is a perspective view of an instrument panel including the present invention.
Figure 2:
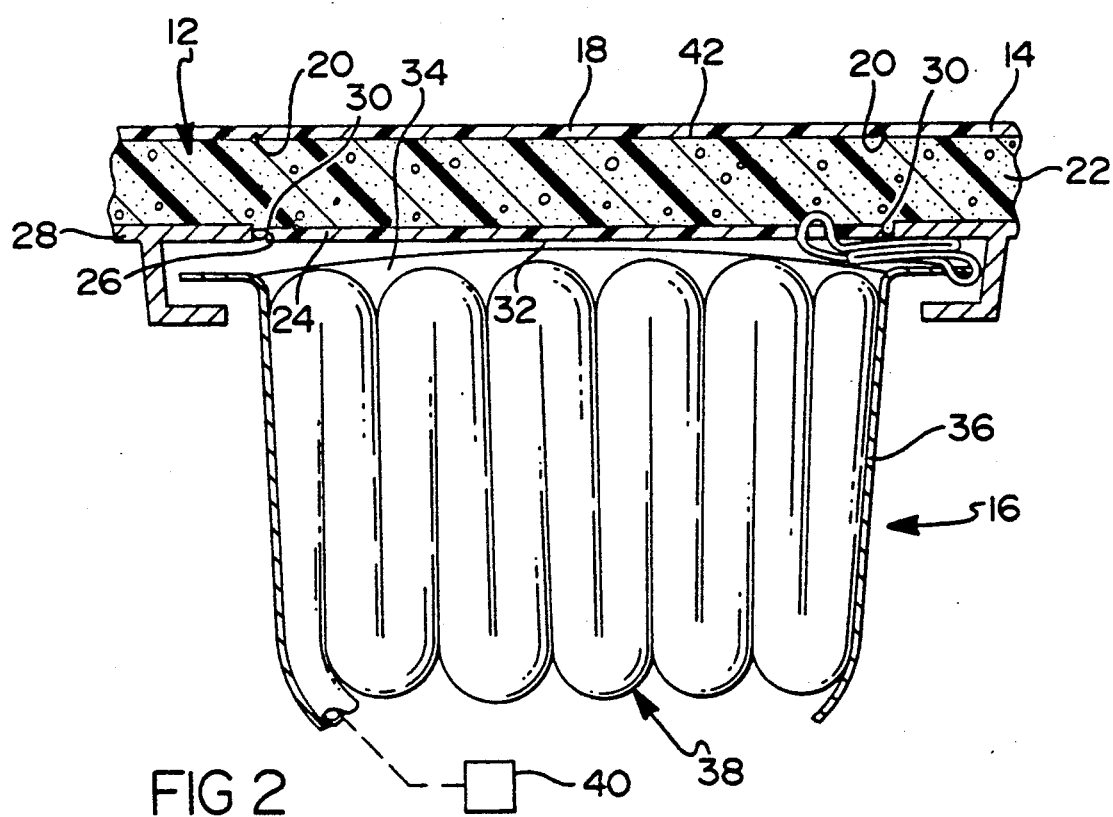
FIG. 2 is an enlarged sectional view taken along the line 2—2 of FIG. 1 looking in the direction of the arrows.

Referring now to FIG. 1, an instrument panel assembly 10 is shown having an uninterrupted outer skin or shell 12 which includes a top cover assembly 14 located above an airbag restraint system 16 for deployment into the passenger compartment of a vehicle upon the vehicle sustaining an impact force above a predetermined level.

The cover assembly 14 includes an outer shell or skin 18 which is formed from either urethane or plastisol materials including a thermoplastic resin and a suitable plasticizer, e.g., polyvinyl chloride or thermoplastic elastomers such as styrenic block copolymers, polyurethanes, copolyesters or polyolefins.

The outer shell 18 has an inboard surface that includes weakened sections 20 representatively shown as V-grooves. The weakened sections 20 are filled with backing material in the form of a foam layer 22. The foam layer 22 completely fills the weakened sections 20 so that the smooth outer surface 18a of the outer shell 18 will not collapse into the instrument panel 10 to form an imperfection in the surface thereof.

An insert 24 is formed in situ of the filler material of the foam layer 22 at an opening 26 formed through a retainer member 28 for securing the instrument panel 10 to a vehicle frame.

The insert 24 has perimeter edges 30 which are aligned with the weakened sections 20 at a point vertically below the weakened sections for purposes to be described.

The insert 24 also has an inboard surface 32 which is located immediately above the outlet 34 from an airbag housing 36 supported with respect to the retainer 28 by suitable support members not shown. The housing 36 forms a canister for an expandable airbag 38 shown in a preinflation position with the folds of the airbag arranged to expand into impact engagement with the inboard surface 32.

The interior of the airbag 38 is connected with a suitable source of inflatant such as a nitrogen generator 40.

The insert 24 is preferably formed from a 20 light weight rigid material such as aluminum. The insert 24 is engaged by the airbag 38 as it inflates to force the rigid plate or insert 24 upwardly through the foam layer 22 to compress the foam layer 22 tightly between the inflating airbag 38 and the outer shell 18. The foam layer remains relatively uncompressed at points laterally outwardly of the perimeter edges 30 of the insert 24. The pressure from the compressed foam will stress the outer shell 18 at the weakened sections 20 therein to cause the outer shell 18 to separate from the instrument panel and form an access hole therethrough having the shape shown in outline in the outer shell 18 in FIG. 1. At the same time the impact of the inflating airbag 38 will cause the perimeter edges 30 of the insert 24 to separate the compressed foam layer from the uncompressed portion of the foam layer 22.

Figure 3:
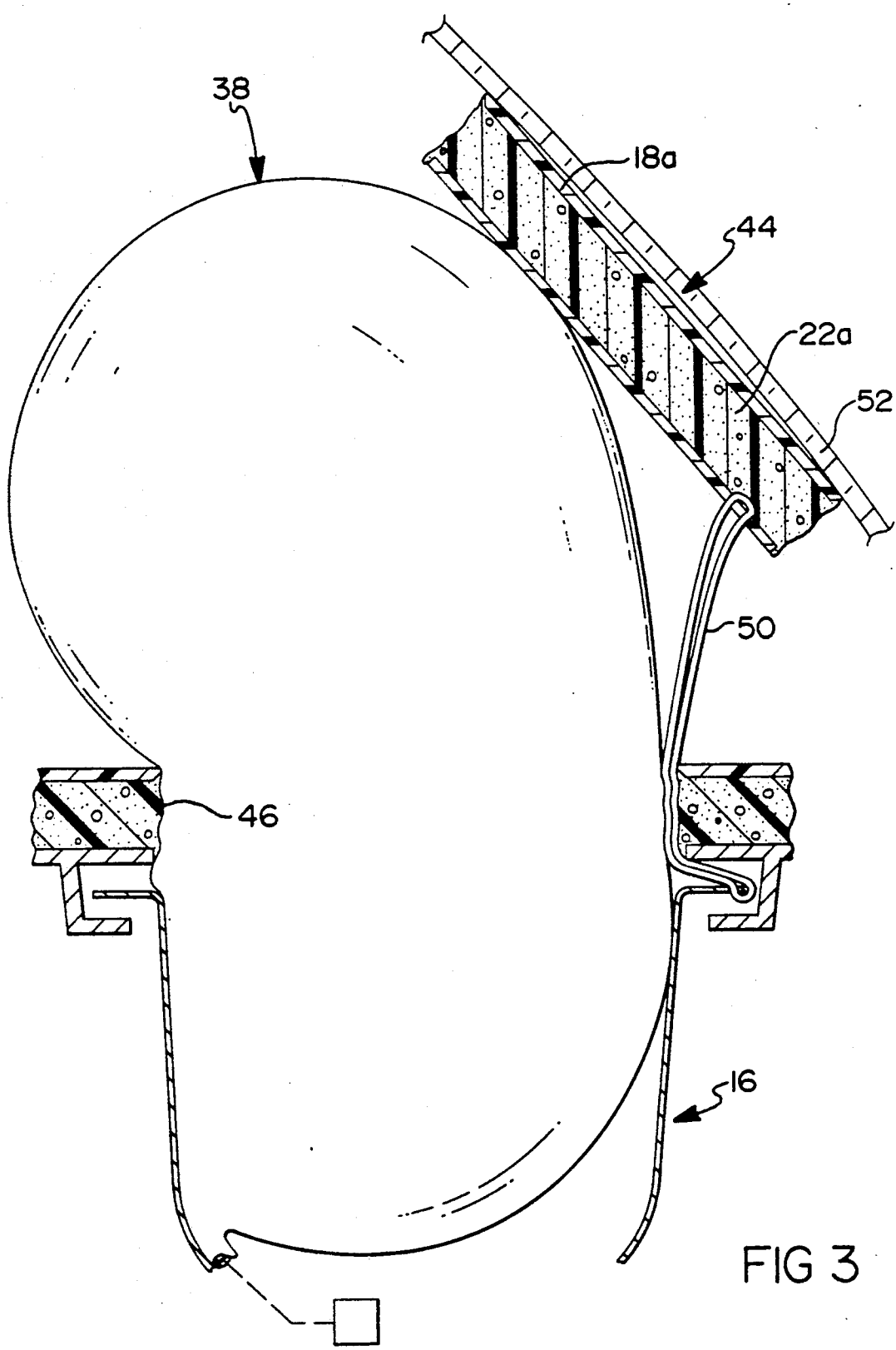
FIG. 3 is a sectional view like FIG. 2 showing the hidden door separated from the instrument panel.

Since the insert 24 if formed in-situ of the foam layer 22 and the outer shell 18 is bonded at an interface 42 with the foam layer 22, the aforedescribed action of the insert 24 will cause a door segment 44 to be formed and separated from the instrument panel 10. The door segment 44 will be comprised of the insert 24, a separated layer of foam 22a and a separated segment 18a of the outer shell 18. The door segment 44 will be directed upwardly and outwardly of the instrument panel so as to impact against the windshield of the vehicle which will absorb the impact energy. At the same time the airbag 38 will be deployed through a resultant opening 46 in the instrument panel as shown in FIG. 3 for protecting a passenger in the vehicle.

A tether 50 is provided having one end connected to the retainer member 28 and the other end connected to the insert 24 to prevent the separated door segment 44 from being ejected into the passenger compartment after the impact energy imparted thereto is absorbed by the windshield of the vehicle.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A cover assembly including an outer cover member for concealing an airbag restraint system (16) including an airbag, a housing for the airbag, a gas generator located in the housing for supplying gas to the airbag in response to vehicle impact the cover assembly comprising:

the outer cover member (14) having an inner surface with grooves (2) formed therein forming edges of a segment (44) to be separated from said outer cover member for forming an opening (46) for deployment of an airbag into a passenger compartment of a vehicle;

backing means (22) including foam filling said grooves and a rigid plate (24) backing the foam and located inboard of said outer cover member for preventing collapse of said cover member at said grooves;

said rigid plate (24) being engageable with said airbag as it inflates to cause said rigid plate to stress the outer cover member at said grooves to cause said segment to separate from said outer cover member so as to produce a passage through said outer cover member for deployment of the airbag therethrough and into a passenger compartment of a vehicle.

2. An interior trim member (10) having an invisible door (44) for concealing an airbag restraint system (16) including a airbag, an airbag housing, a gas generator and a retaining member for supporting the interior trim member on a vehicle frame characterized by:

the interior trim member (10) having an outer shell (18) with a smooth outer surface and with grooves (20) formed on the inner surface of the outer shell to define the perimeter of an invisible door (44) for separation from the outer shell to form an opening (46) for deployment of the airbag through the outer skin;

filler means (22) for filling the grooves with material to prevent the smooth outer surface from collapsing inwardly of the outer skin;

and an insert (24) located within said interior trim member engageable with said airbag upon initial inflation thereof to cause said insert to be directed against said filler means to cause said outer shell to be stressed at said grooves to cause said hidden door (44) to be separated from said outer skin for passage of said filler means and said insert outwardly of said interior trim member panel so as to defined the opening therein for deployment of said airbag; and means (50) for tethering said separated hidden door to said retainer following deployment of said airbag.

3. The interior trim member of claim 2 further characterized by said filler means being a layer of foam material (22) for resiliently supporting said outer cover against collapse at said grooves therein and said insert being formed in situ of said foam material and bonded thereto.

4. The interior trim member of claim 2 further characterized by said outer cover formed as the outer shell (18) fully covering an instrument panel and having the grooves therein formed so as to direct the separated hidden door against a vehicle windshield (52) located above the instrument panel for absorbing the impact thereof as the airbag is deployed into the passenger compartment.

5. The interior trim member of claim 4 further characterized by said filler means being a layer of foam material (22) for resiliently supporting said outer cover against collapse at said grooves therein and said insert being formed in situ of said foam material and bonded thereto.

6. The cover assembly of claim 1 further characterized by said foam being a layer of foam material (22) for resiliently supporting said outer cover member against collapse at said grooves therein and said rigid plate being formed in situ of said foam material and bonded thereto.

7. The cover assembly of claim 1 further characterized by said outer cover member formed as the outer shell (18) fully covering an instrument panel and having said grooves therein formed so as to direct the separated segment against a vehicle windshield (52) located above the instrument panel for absorbing the impact thereof as the airbag is deployed into the passenger compartment.

8. The cover assembly of claim 7 further characterized by said foam being a layer of foam material (22) for resiliently supporting said outer cover member against collapse at said grooves therein and said rigid plate being formed in situ of said foam material and bonded thereto.

* * * * *